J. S. BARNES.
GEARING.
APPLICATION FILED OCT. 22, 1906. RENEWED MAY 7, 1908.
948,583.
Patented Feb. 8, 1910.
2 SHEETS—SHEET 1.
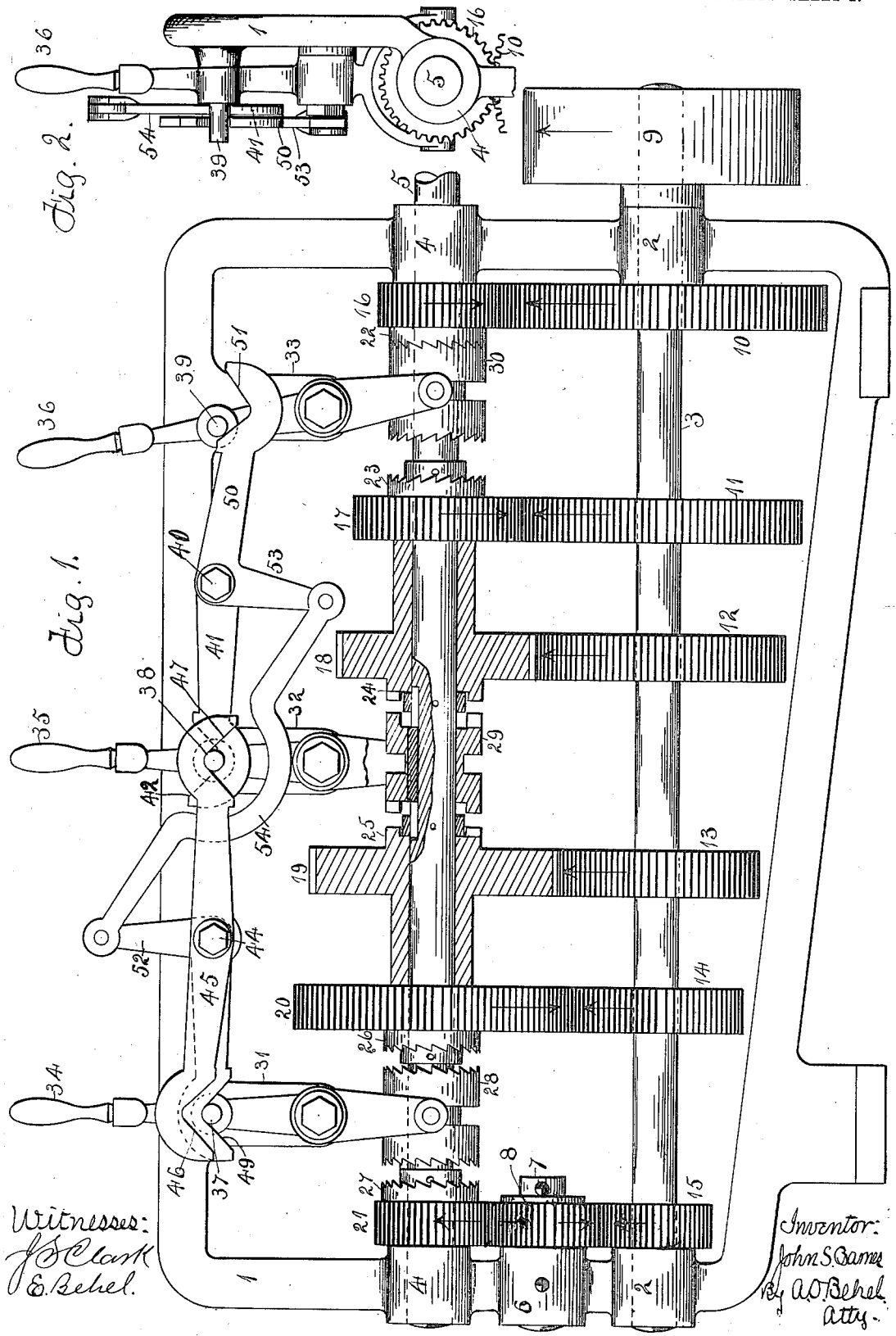

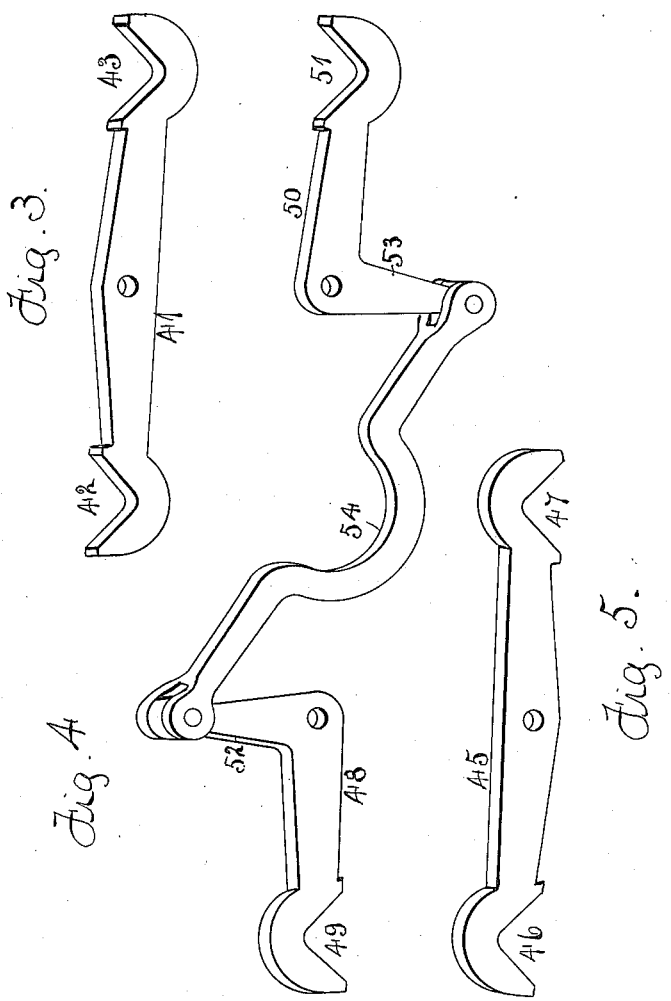

UNITED STATES PATENT OFFICE.

JOHN S. BARNES, OF ROCKFORD, ILLINOIS, ASSIGNOR TO W. F. & JOHN BARNES COMPANY, OF ROCKFORD, ILLINOIS, A CORPORATION OF ILLINOIS.

GEARING.

948,583.  Specification of Letters Patent.  Patented Feb. 8, 1910.

Application filed October 22, 1906, Serial No. 340,085. Renewed May 7, 1908. Serial No. 431,336.

*To all whom it may concern:*

Be it known that I, JOHN S. BARNES, a citizen of the United States, residing at Rockford, in the county of Winnebago and State of Illinois, have invented certain new and useful Improvements in Gearing, of which the following is a specification.

The object of this invention is to provide shiftable transmitting elements, a pair of shifter levers for moving said elements and a member independent of the levers but adapted to be moved into engagement therewith, through the engagement of which, both levers are prevented from occupying an operative position at the same time.

In the accompanying drawings, Figure 1 is an elevation partly in section of my improved gearing. Fig. 2 is an end elevation of the driven shaft and one of the clutch throwing levers. Figs. 3, 4 and 5 are isometrical representations of the neutralizing bars.

The frame 1 is provided with bearings 2 forming supports for the driving shaft 3; bearings 4 for the driven shaft 5, and a bearing 6 for a stud 7 which supports an intermediate toothed-wheel 8. To the driving shaft 3 are fixedly connected the driving pulley 9, and spur-toothed wheels 10, 11, 12, 13, 14 and 15. The driven shaft 5 supports spur-toothed wheels 16, 17, 18, 19, 20 and 21 in a manner to permit them to revolve idly on the shaft. These toothed-wheels each have a saw-toothed clutch face 22, 23, 24, 25, 26 and 27 respectively. The intermediate toothed-wheel 8 meshes with the toothed wheels 15 and 21, thereby changing the direction of rotation of the toothed-wheel 21 from the other toothed-wheels mounted on the driven shaft. On the driven shaft are splined three double faced sliding clutch sections 28, 29 and 30. The clutch section 28 is located between the wheels 20 and 21, the clutch section 29 is located between the toothed wheels 18 and 19, and the clutch section 30 is located between the toothed wheels 16 and 17.

From the main frame extend three projections 31, 32 and 33. A shifting lever 34 has a pivotal connection with the projection 31, its lower end has an engagement with the clutch section 28. A shifting lever 35 has a pivotal connection with the projection 31, its lower end has an engagement with the clutch section 29, and a shifting lever 36 has a pivotal connection with the projection 33, its lower end has an engagement with the clutch section 30. The shifting lever 34 has a stud 37 extending from it, and is located between its handle end and its pivot. The shifting levers 35 and 36 have like studs 38 and 39 respectively. Thus far as described, the levers 34, 35 and 36 could be independently operated and three of the toothed wheels of the driving shaft could be connected with the driven shaft at the same time, and as the toothed wheels are of varying diameters it would cause a lock between the wheels, or a breakage of some of the wheels. It is therefore necessary that means be provided whereby only one of the toothed wheels on the driving shaft can be in connection with the driven shaft at the same time.

On a stud 40 extending from the main frame located equi-distant between the levers 35 and 36 is pivoted a neutralizing bar 41 shown at Fig. 3. This bar has its ends formed with V notches 42 and 43, which face upward. On a stud 44 extending from the main frame located equi-distant between the levers 34 and 35 is pivoted a neutralizing-bar or locking lever 45 shown at Fig. 5. This bar or locking lever has its ends formed with V shaped notches 46 and 47 which face downward. On the stud 44 is pivoted a bell-crank lever 48 shown at Fig. 4. One arm of this bell-crank lever is formed with a V shaped notch 49 which faces downward. On the stud 40 is pivoted a bell-crank lever 50 shown at Fig. 4. One arm of this bell-crank lever is formed with a V shaped notch 51 which faces upward. The arm 52 of the bell-crank lever 48 and the arm 53 of the bell-crank lever 50 are connected by a link 54 shown at Fig. 4. The V shaped notches 46 and 49 are located over the stud 37 of the lever 34, the V shaped notches 43 and 51 are located under the stud 39 of the lever 36, the V shaped notch 47 is located over the stud 38 of the lever 35, and the V shaped notch 42 is located under the same stud 38.

With the parts in the position shown at Fig. 1 the lever 36 is free to move in either direction without the stud 39 engaging the walls of either of the V shaped notches 43 and 51. By the movement of this lever 36 the clutch section 30 can be moved into engagement with either of the spur-toothed wheels 16 and 17 which will impart different speeds to the driven shaft 5 in the same direction. Should the lever 36 be in the position shown in Fig. 1 which will form a connection between the clutch section 30 and toothed-wheel 16, and it was desirable to reverse the speed of the driven shaft, it will be necessary to disengage the clutch-section 30 from the toothed-wheel 16 before a connection is formed between clutch-section 28 and the toothed-wheel 21, and this movement be accomplished by the movement of the lever 34. The first portion of the movement of the lever 34 will cause the stud 37 to engage the wall of the V shaped notch 49 of the bell-crank lever 48, thereby rocking the bell-crank lever on its pivot. The rocking movement of this bell-crank lever 48 will rock the bell-crank lever 50 on its pivot by reason of the link 54 connecting them which will elevate the end of the lever having the V shaped notch 51, and the wall of the notch will engage the stud 39 of the lever 36 until it is in the center of the notch when the clutch-section 30 will be disengaged from the toothed-wheel 16. Should the lever 34 be moved to place the clutch-section 28 in engagement with the toothed-wheel 20, the same movements of the bell-crank levers 48 and 50 will follow as the stud 37 will bear against the opposite wall of the V shaped groove 49 of the lever 45.

When the levers 34 and 36 are being moved, the lever 35 will be held neutral by the V shaped grooves 42 and 47 of the bars 41 and 45 engaging it. The movement of any one of the levers will place the other levers in a neutral position before the clutch-section of the moving lever engages the clutch face of a toothed-wheel. The movement of the lever 35 will move the neutralizing bars 41 and 45 which will insure the levers 35 and 36 being placed neutral. By this arrangement of levers and clutches and neutralizing bars five speeds in one direction and one reverse speed may be had, but it is evident that more reverse speeds may be had by the use of less number of speeds ahead. If only two levers be employed, the bell-cranks and the links connecting them will not be employed.

By the employment of the movable bar, it can be moved by the lever which is occupying a neutral position to cause it to engage the other lever and hold it neutral, which will permit the first lever to be moved into an operative position. Both levers must occupy a neutral position before either can be placed into an operative position.

I claim as my invention:

1. The combination of a shaft, a plurality of power transmitting wheels loosely mounted on the shaft, and each provided with a clutch face, two clutch sections adapted to engage the clutch faces of the wheels thereby forming a connection of the wheels and the shaft, a lever for each clutch section provided with a stud, and a pivoted bar having its ends formed with V shaped notches with which the studs may engage.

2. The combination of a shaft, a plurality of power transmitting wheels loosely mounted on the shaft, and each provided with a clutch face, two clutch sections adapted to engage the clutch faces of the wheels, thereby forming a connection of the wheels and the shaft, a lever for each clutch section provided with a stud, and a pivoted bar having its ends formed with V shaped notches with which the studs may engage, the notches facing in the same direction.

3. The combination of a shaft, a plurality of power transmitting wheels loosely mounted on the shaft and each provided with a clutch face, three clutch sections adapted to engage the clutch faces of the wheels, thereby forming a connection of the wheels and the shaft, a lever for each clutch section provided with a stud, two pivoted bars, each having its ends formed with V shaped notches with which the studs may engage, the notches of one bar facing in one direction, and the notches of the other bar facing in the opposite direction, the stud of the center lever located to receive the notches of one end of each bar, two pivoted bell-crank levers, one arm of each bell-crank lever provided with a V shaped notch, a link connection between the bell-crank levers, the notch of one bell-crank lever so located as to receive the stud of one of the end levers and the notch of the other bell-crank lever located to receive the stud of the other end lever.

4. The combination of a shaft, a plurality of wheels loosely mounted on the shaft and each provided with a clutch face, two clutch sections adapted to engage the clutch faces of the wheels, thereby forming a connection between the wheels and the shaft, a lever for each clutch section, a neutralizing-bar pivoted between the levers and with which each lever is adapted to contact, thereby preventing both clutch sections from occupying an operative position at the same time.

5. The combination of a shaft, a plurality of wheels loosely mounted on the shaft and each provided with a clutch face, two clutch sections adapted to engage the clutch faces of the wheels, thereby forming a connection between the wheels and the shaft, a lever for each clutch section, a neutralizing-bar pivoted between the levers, the levers formed with projections and the ends of the bar formed with V shaped notches which are adapted to interconnect, thereby preventing both clutch sections from occupying an operative position at the same time.

6. The combination of a shaft, a plurality of wheels loosely mounted on the shaft and each provided with a clutch face, two clutch sections adapted to engage the clutch faces of the wheels, thereby forming a connection between the wheels and the shaft, a lever for each clutch section, a neutralizing-bar pivoted between the levers, one end of the bar and a lever formed with a projection and V shaped notch, and the other end of the bar and the other lever formed with a projection and V shaped notch thereby preventing both clutch sections from occupying an operative position at the same time.

7. The combination of a shaft, a plurality of wheels loosely mounted on the shaft and each provided with a clutch face, two clutch sections adapted to engage the clutch faces of the wheels, thereby forming a connection between the wheels and the shaft, a lever for each clutch section, a pivoted neutralizing-bar connecting the levers in a manner to prevent both clutch sections from occupying an operative position at the same time.

8. The combination of a shaft, a plurality of wheels loosely mounted on the shaft and each provided with a clutch face, two clutch sections adapted to engage the clutch faces of the wheels, thereby forming a connection between the wheels and the shaft, a lever for each clutch section, a pivoted neutralizing-bar connecting the levers in a manner to hold one clutch section inoperative and permitting the free movement of the other clutch section.

9. The combination of a shaft, a plurality of wheels loosely mounted on the shaft and each provided with a clutch face, two clutch sections adapted to engage the clutch faces of the wheels, thereby forming a connection between the wheels and the shaft, a lever for each clutch section, a pivoted neutralizing-bar connecting the levers in a manner to prevent the free movement of both clutch sections at the same time.

10. The combination of a shaft, a plurality of transmitting wheels loosely mounted on the shaft and each provided with a clutch face, two clutch sections adapted to engage the clutch faces of the wheels, thereby forming a connection between the wheels and the shaft, a lever for each clutch section, a pivoted neutralizing-bar connecting the levers so that the first movement of one lever will move the bar thereby holding the other lever in neutral position before the first lever can be moved into operative position.

11. The combination with a plurality of shiftable power transmitting clutch elements, of a shifting lever for each, and a single member for locking each of the levers with its clutch element in inoperative position when the other is in operative position, said member having a detachable interlocking engagement directly with the lever that is inoperative and being held in such detachable interlocking engagement by the other lever.

12. The combination with a plurality of power transmitting devices movable to operative and inoperative positions, of controlling means therefor including separate shifting devices, and a locking lever having means that detachably grasps each shifting device and simultaneously releases the other shifting device, said lever being moved respectively by the shifting devices.

13. The combination with shifting levers, of a locking lever therefor having different portions respectively movable into and out of interlocking engagement with the shifting levers to hold one against movement when the other is operative, all of said levers having substantially parallel axes of rotation.

14. The combination with shifting levers, of a locking lever fulcrumed between its ends, said shifting levers being movable longitudinally of the locking lever, the ends of said locking lever respectively moving into and out of direct interlocking engagement with the shifting levers, and by such interlocking engagement, holding the latter levers against movement.

15. The combination with a pair of shifting levers, of a lever controlled by the shifting levers for locking one of said shifting levers in a neutral position when the other is in an operative position, one of said shifting levers and the locking lever being provided, one with a projection, and the other with a notch to receive the projection, and the other of said shifting levers and the locking lever being likewise provided one with a projection and the other with a notch to receive the projection.

16. The combination with pivotally mounted shifting levers, of a locking bar pivotally mounted between its ends and having said ends disposed adjacent to the shifting levers, each end of said bar and the lever associated therewith being provided one with a projection and the other with a notch to receive the projection and thereby lock one lever against movement when the other is operated.

JOHN S. BARNES.

Witnesses:
A. O. Behel,
E. Behel.